US010453436B2

(12) United States Patent
Chen et al.

(10) Patent No.: US 10,453,436 B2
(45) Date of Patent: Oct. 22, 2019

(54) ANTI-ACOUSTICS STREAMLINE APPARATUS

(71) Applicant: QUANTA COMPUTER INC., Taoyuan (TW)

(72) Inventors: Chao-Jung Chen, Taoyuan (TW); Yu-Nien Huang, Taoyuan (TW); Ching-Yu Chen, Taoyuan (TW); Tsung-Ta Li, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 297 days.

(21) Appl. No.: 15/401,976

(22) Filed: Jan. 9, 2017

(65) Prior Publication Data
US 2018/0197523 A1 Jul. 12, 2018

(51) Int. Cl.
*G10K 11/16* (2006.01)
*F04D 29/66* (2006.01)
(Continued)

(52) U.S. Cl.
CPC .......... *G10K 11/161* (2013.01); *F04D 25/166* (2013.01); *F04D 29/663* (2013.01);
(Continued)

(58) Field of Classification Search
CPC .. G10K 11/161; F24F 13/24; F24F 2013/242; F04D 29/66; F04D 29/663; F04D 29/664; F04D 29/667; G11B 33/08; F16L 55/033; H05K 7/20; H05K 7/20136; H05K 7/20145
See application file for complete search history.

(56) References Cited

U.S. PATENT DOCUMENTS 1,865,677 A * 7/1932 Cheyney ................. F24F 13/24
138/38
3,454,128 A * 7/1969 Nopper ..................... F24F 7/02
181/224
(Continued)

FOREIGN PATENT DOCUMENTS

CN 2893170 Y 4/2007
CN 105351046 A 2/2016

OTHER PUBLICATIONS

Taiwanese Office Action for Application No. 106111584, dated Sep. 21, 2017, w/ First Office Action Summary.

*Primary Examiner* — Edgardo San Martin
(74) *Attorney, Agent, or Firm* — Nixon Peabody LLP; Zhou Lu (57) ABSTRACT

An anti-acoustics streamline apparatus is provided. The apparatus includes an air impedance wall having a front face, a rear face, and a plurality of openings extending from the front face to the rear face defining open areas; and a plurality of flow separating structures disposed adjacent to the front face, each of the plurality of flow separating structure extending vertically along the front face of the wall. The openings are configured to define first wall regions in the air impedance wall adjacent to each of the plurality of flow separating structures and second wall regions between the first wall regions. A first ratio of the open areas in the first wall regions to a total area in first wall regions is less than a second ratio of the open areas in the second wall regions to a total area in the second wall regions.

18 Claims, 7 Drawing Sheets

(51) Int. Cl.
  *G11B 33/14* (2006.01)
  *G11B 33/08* (2006.01)
  *G11B 33/12* (2006.01)
  *G10K 11/175* (2006.01)
  *F04D 25/16* (2006.01)
(52) U.S. Cl.
  CPC .......... *F04D 29/664* (2013.01); *G10K 11/175* (2013.01); *G11B 33/08* (2013.01); *G11B 33/128* (2013.01); *G11B 33/142* (2013.01)

(56) References Cited

U.S. PATENT DOCUMENTS

| | | | | |
|---|---|---|---|---|
| 4,116,269 A * | 9/1978 | Ikeda | | F01P 3/18 |
| | | | | 123/41.49 |
| 4,685,533 A * | 8/1987 | Piesik | | F01N 1/08 |
| | | | | 181/213 |
| 4,894,749 A * | 1/1990 | Elko | | G06F 1/20 |
| | | | | 165/104.33 |
| 5,361,188 A * | 11/1994 | Kondou | | H01L 23/467 |
| | | | | 165/104.34 |
| 5,428,503 A * | 6/1995 | Matsushima | | H05K 7/20154 |
| | | | | 165/908 |
| 5,491,310 A * | 2/1996 | Jen | | E04B 1/86 |
| | | | | 181/286 |
| 5,663,536 A * | 9/1997 | Kaplan | | F28C 1/10 |
| | | | | 181/224 |
| 5,889,651 A * | 3/1999 | Sasaki | | G01R 31/2891 |
| | | | | 165/908 |
| 6,104,608 A * | 8/2000 | Casinelli | | H05K 7/20172 |
| | | | | 181/224 |
| 6,174,342 B1 * | 1/2001 | Jeanseau | | B01D 46/10 |
| | | | | 55/385.2 |
| 6,222,729 B1 * | 4/2001 | Yoshikawa | | H05K 7/20154 |
| | | | | 174/16.1 |
| 6,419,576 B1 * | 7/2002 | Han | | F04D 29/664 |
| | | | | 181/224 |
| 6,457,554 B1 * | 10/2002 | Wang | | E04B 1/84 |
| | | | | 181/198 |
| 7,314,113 B2 * | 1/2008 | Doll | | E04F 17/04 |
| | | | | 165/135 |
| 7,712,576 B2 * | 5/2010 | Goto | | G06F 1/182 |
| | | | | 181/200 |
| 7,779,960 B2 * | 8/2010 | Tang | | H05K 7/20727 |
| | | | | 181/224 |
| 7,845,463 B2 * | 12/2010 | Yabe | | F01N 1/10 |
| | | | | 181/198 |
| 7,929,295 B2 * | 4/2011 | Joshi | | F04D 25/166 |
| | | | | 181/198 |
| 8,087,492 B2 * | 1/2012 | Cursetjee | | F24F 3/1603 |
| | | | | 181/224 |
| 8,579,074 B2 * | 11/2013 | Kosaka | | F02C 7/045 |
| | | | | 181/214 |
| 9,330,651 B1 * | 5/2016 | Wang | | G10K 11/172 |
| 2006/0054380 A1 | 3/2006 | Doll | | |
| 2008/0007912 A1 * | 1/2008 | Matsushima | | G11B 33/128 |
| | | | | 361/695 |
| 2008/0065245 A1 | 3/2008 | Tang et al. | | |
| 2018/0330712 A1 * | 11/2018 | Chen | | G11B 33/08 |

\* cited by examiner

ANTI-ACOUSTICS STREAMLINE APPARATUS

FIELD OF THE INVENTION

The present invention relates to apparatuses for suppressing noise emanating from individual electronic units within a server device.

BACKGROUND

The operating of a server system produces unnecessary heat. If the unnecessary heat produced during the operation of the server system is not removed, the efficiency of the server system will be lowered, and in turn the server system will be damaged. Typically, a fan is installed in the server system to dissipate heat and cool the server system.

With the increasing of the operating speed of the server system, the heat produced during the operation of the server system is greatly increased. A high-speed fan is introduced to remove the unnecessary heat produced by the server system. However, noise made by the high-speed fan is louder than that of a typical fan. In light of these reasons, the optimization design for noise reducing and heat dissipating of the computer system is imperative.

When heat dissipation efficiency is enhanced, airflow is essentially accelerated. The stronger the airflow is the more turbulent and noisy the wake flow is. In certain cases, when airflow is accelerated, the HDD performance of reading/writing data will be poor while jet flow is formed. Thus, a server system manufacturer faces a challenge between noise, heat dissipation efficiency and HDD Read/write performance.

SUMMARY

Embodiments of the invention concern an anti-acoustics streamline apparatus for hard drive disk jet flow. An apparatus according to the various embodiments can include an air impedance wall having a front face, a rear face, and a plurality of openings extending from the front face to the rear face defining open areas. The apparatus can also include a plurality of flow separating structures disposed adjacent to the front face, each of the plurality of flow separating structure extending vertically along the front face of the wall.

In some embodiments of the invention, the plurality of openings are configured to define first wall regions in the air impedance wall adjacent to each of the plurality of flow separating structures and second wall regions between the first wall regions. Furthermore, in some embodiments of the invention, a first ratio of the open areas in the first wall regions to a total area in first wall regions is less than a second ratio of the open areas in the second wall regions to a total area in the second wall regions.

In an exemplary embodiment of the apparatus, each of the plurality of flow separating structures can include a vertically extending member with a curved leading surface facing away from the front face and one or more supporting members coupling the at least one vertically extending member to the air impedance wall. In some embodiments, the vertically extending member is a cylindrical rod. In an exemplary embodiment of the apparatus, the first ratio is uniform across the first wall regions, and the second ratio is uniform across the second wall regions.

In an exemplary embodiment of the apparatus, the second ratio is at least two times greater than the first ratio.

Furthermore, in an exemplary embodiment of the apparatus, the width of each the first regions is 4× to 5× the width of a corresponding one of the plurality of flow separating structures. In some embodiments of the invention, the apparatus can include a sound absorber disposed adjacent to the rear face. The sound absorber can include a plurality of ducts extending away from the rear face. Furthermore, the plurality of ducts is disposed in the sound absorber in regions between each of the flow separating structures.

DETAILED DESCRIPTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

In order to resolve the issue of balance noise, heat dissipation efficiency and HDD read/write performance preferred embodiments of the present invention provide an anti-acoustics streamline apparatus for hard drive disk jet flow. In this disclosure, the anti-acoustics streamline apparatus will serve as an aerodynamic device with a sound absorber to enhance hard disk drive performance by resolving the issue between noise, heat dissipation efficiency and HDD read/write performance.

Figure 1:
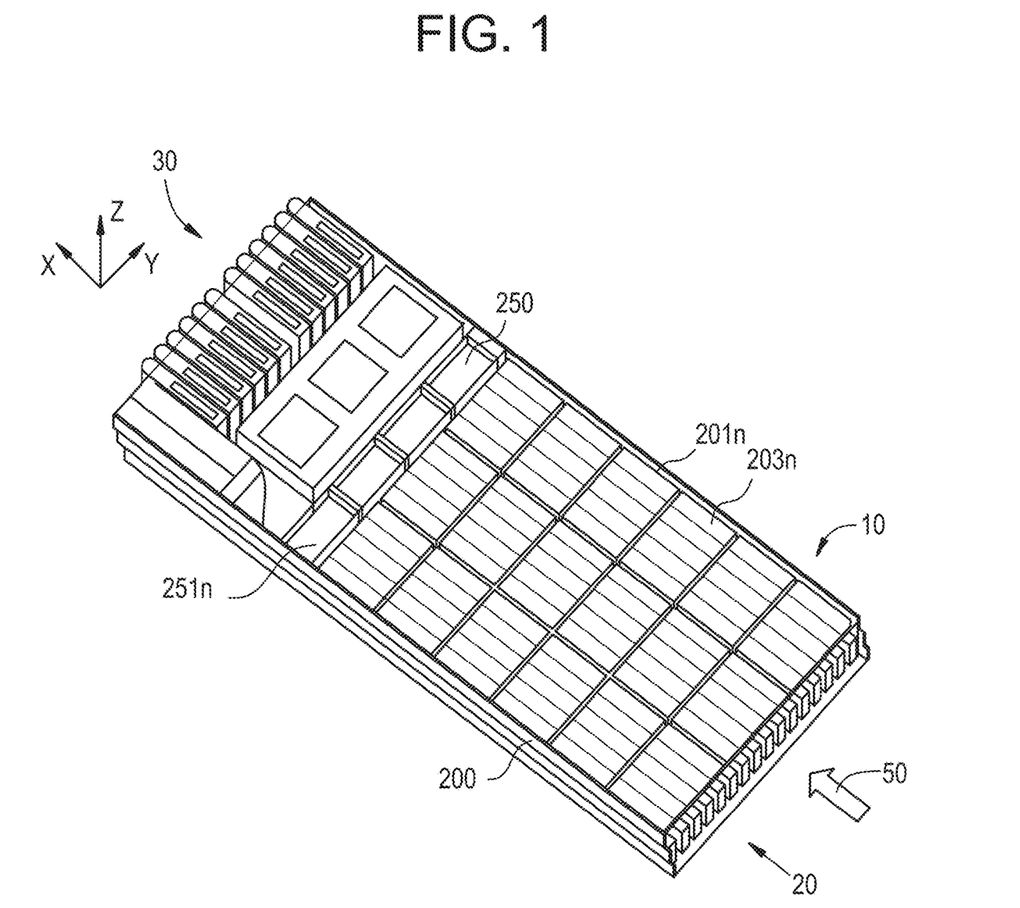
FIG. 1 is a top isometric view of a system that includes hard drive disk jet flow according to an embodiment.
Figure 2:
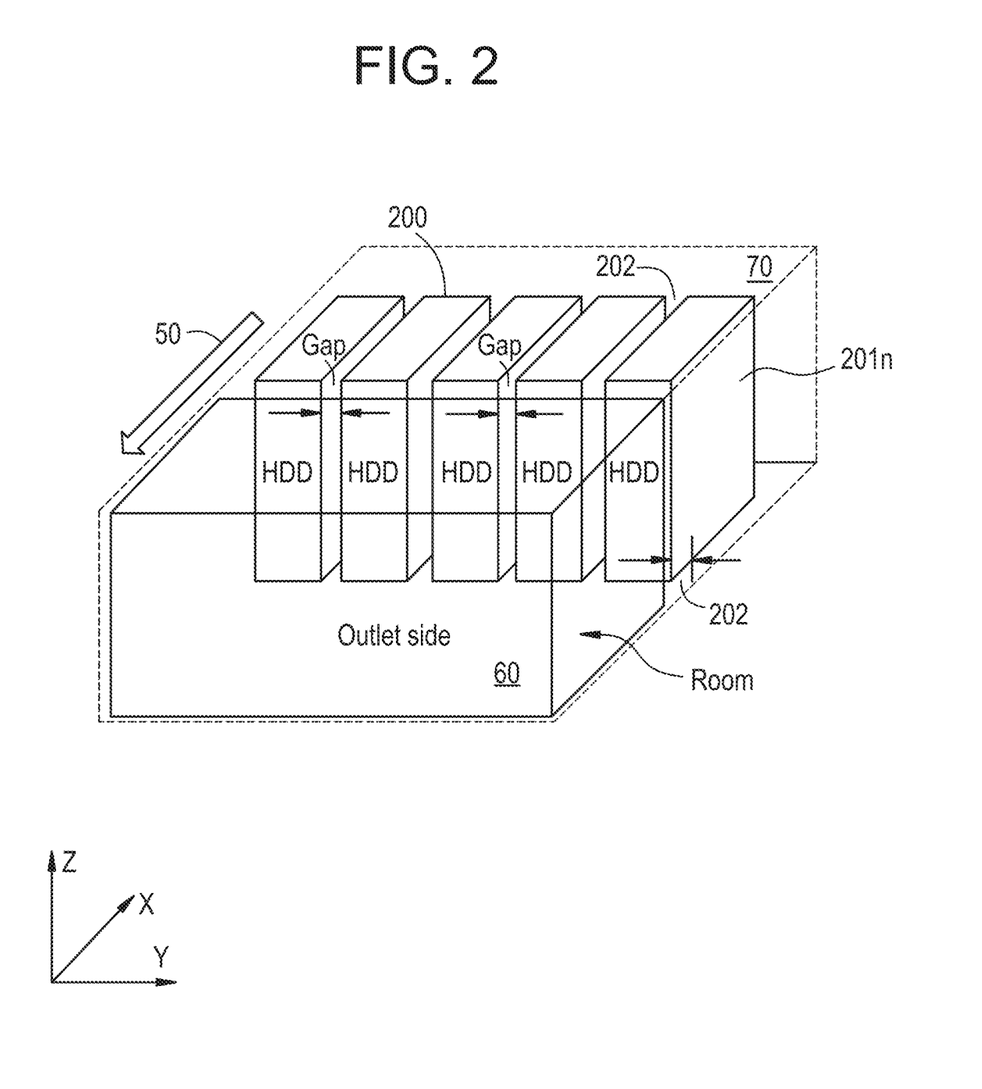
FIG. 2 is a front isometric views of the system that includes hard drive disk jet flow according to an embodiment.

FIGS. 1 and 2 are top and front isometric views of a server device 10 exemplifying air flow 50 according to an embodiment. In some embodiments, the server device 10 includes a plurality of fan modules 250 and a storage array module 200. The server device can include a front end 20 and a rear end 30. The air flow 50 can come across the server device 10 and the encompassed storage array module 200 from the front end 20 to the rear end 30 via the plurality of fan modules 250. It should be realized that the server device 10 includes other components not mentioned herein. The components mentioned above are only for example, and not to limit this disclosure. The person having ordinary knowledge in the art may flexibly include other components in accordance to the invention.

In some embodiments, the storage array module 200 is disposed in the server device 10. To maximize storage, the storage array module 200 can include a plurality of storage arrays 201n closely stacked together. The space 202 between the plurality of storage arrays 201n is very small, to maximize the number of storage arrays 201n. In FIG. 1, the storage array module 200 can include eighteen storage arrays closely stacked together. Each of the storage arrays contains a plurality of disk devices 203n. The plurality of disk devices 203n can include hard disk drive, solid state disk drives, or a combination thereof. Furthermore, for the purpose of this invention, the plurality of disk devices 203n can include other drive technology not detailed herein. In FIG. 1, the plurality of disk devices can include ninety hard disk drives. It should be realized that the quantities of the storage arrays (e.g. eighteen) and disk devices (e.g. ninety) mentioned above are only for example, and not to limit this disclosure. The person having ordinary knowledge in the art may flexibly select any proper quantity of storage arrays according to the requirement.

The plurality of fan modules 250 in the server device 10 is arranged in parallel. In an embodiment of the invention, the plurality of fan modules 250 is disposed near the storage array module 200 to cool the storage array module 200 via convection. The plurality of fan modules 250 is utilized to enhance the air convection across the server device 10 from the front end 20 to the rear end 30. The plurality of fan modules 250 can include four high-powered computer device fans 251n. Thus, the air flow 50 generated by the fans 251n flows into and out of the server device 10 along an x-axis though the plurality of storage arrays 201n closely stacked together. Consequently, for efficiency, the air flow flowing along the x-axis in the present embodiment is increased to effectively cool between the nominal spaces between the plurality of storage arrays 201n. This enables the plurality of fan modules 250 to maintain the storage array module 200 at the desired operating temperature. It should be realized that the quantities of the fans (e.g. four) mentioned above are only for example, and not to limit this disclosure. The person having ordinary knowledge in the art may flexibly select any proper quantity of fans in accordance with the disclosure.

Referring now to FIG. 2. The plurality of fan modules 250 is used to draw in air from the inlet side 70 and exhaust the air towards the outlet side 60. In practice, the air flow 50 through the server device 10 is not laminar and a considerable amount of turbulence exists within the plenum of the outlet side 60. Because of the density of the storage array module 200, the air being blown through the space 202 collide in the outlet side 60, resulting in an increased air pressure and turbulence within the plenum. By following the equation of continuity, when air goes in a small gap, the air speed will be increased. As a result, as the air flow 50 passes through the storage array module 200 the air speed increases. When air flow 30 exits the storage array module 200 into the plenum of the outlet side 60, the air flow 50 speed is decreased. The air flow 50 becomes turbulent flow.

In accordance with embodiments of the present invention, an anti-acoustics streamline apparatus is provided for reducing turbulence within the plenum of the outlet side 60 of the server device 10 and channeling the air away from the storage array module 200.

Figure 3:
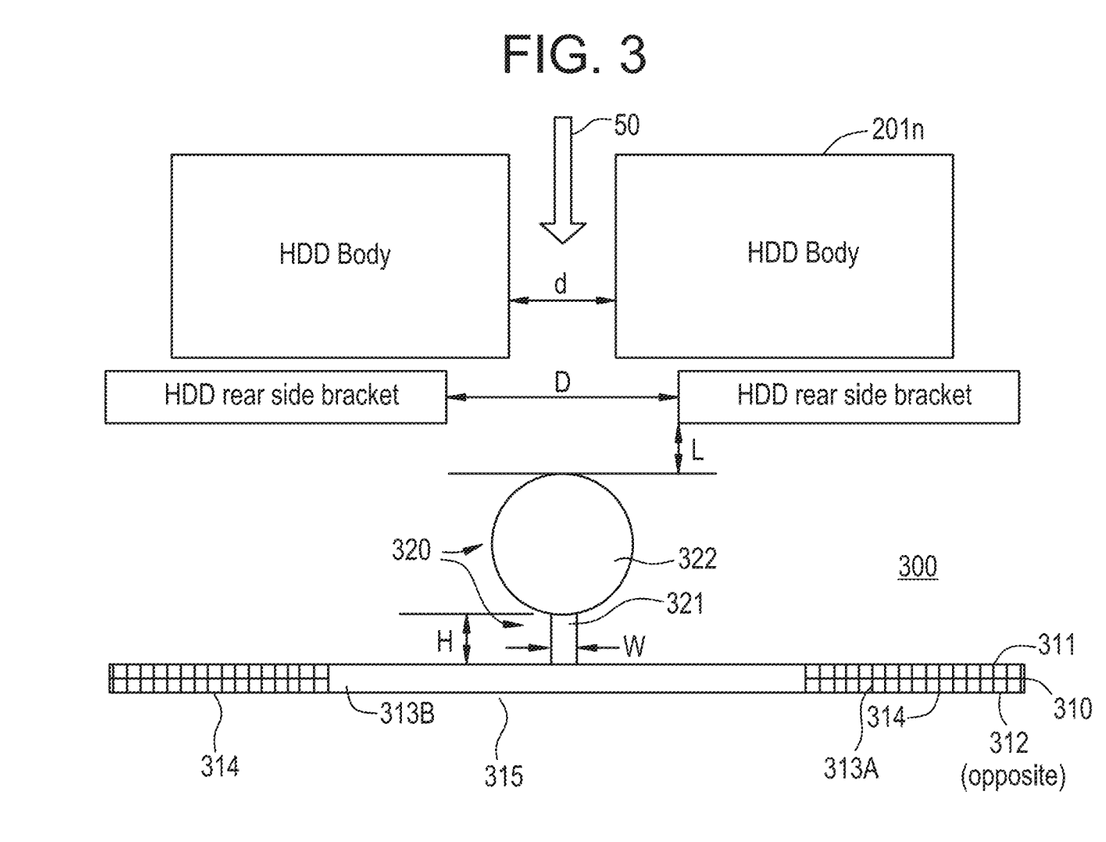
FIG. 3 shows a simplified block diagram of an anti-acoustics streamline apparatus according to an embodiment.

FIG. 3 shows a simplified block diagram of the anti-acoustics streamline apparatus 300. The anti-acoustics streamline apparatus 300 can include an air impedance wall 310 and a plurality of flow separating structures 320. The anti-acoustics streamline apparatus 300 and its components can be made of sheet metal using conventional metal fabrication techniques such as bending, forming, and stamping. As a result, the anti-acoustics streamline apparatus 300 can be made very inexpensively. Alternatively, the anti-acoustics streamline apparatus 300 and its components can be made of aluminum alloy, steel alloy, plastic materials, or any combination thereof. It should be realized that the anti-acoustics streamline apparatus 300 and its components can be made of any material constructed to withstand varying temperatures, fire proof, shock-vibration and air flow of high velocity. The materials mentioned above are only for example, and not to limit this disclosure. The person having ordinary knowledge in the art may flexibly select any material in accordance with the disclosure.

In some embodiments of the invention, the air impedance wall 310 can contain a front face 311 and a rear face 312. In an embodiment, the rear face 312 is positioned towards the storage array module 200. Furthermore, the front face 311 is positioned opposite of the rear face 312, and the storage array module 200. The air impedance wall 310 can also include a plurality of openings 313A, 313B extending from the front face to the rear face. The first plurality of openings 313A can have a larger diameter than the second plurality of openings 313B. In an exemplary embodiment, a first wall region 314 of the air impedance wall 310 can have a defining open area of about seventy-percent via the first plurality of openings 313A.

In contrast, a second wall region 315 of the air impedance wall 310 can have a defining open area of about thirty-percent via the second plurality of openings 313B. It should be realized that the plurality of openings 313A, 313B can vary in size. The defined open areas of the air impedance wall 310 mentioned above are only for example, and not to limit this disclosure. The person having ordinary knowledge in the art may flexibly select any size open areas to reflect the various pluralities of openings in accordance with the disclosure. For example, in one embodiment the air impedance wall 310 can include a consistent defined open area to reflect a consistently-sized plurality of openings. In some embodiments, first wall region 314 of the air impedance wall 310 can have a defining open area of about twice the size of the second wall region 315 of the air impedance wall 310.

The anti-acoustics streamline apparatus 300 can include a plurality of flow separating structures 320. In some embodiments, the flow separating structure 320 is located adjacent to the front face of the air impedance wall 310. As shown in FIG. 3, the flow separating structure 320 can extend vertically along the front face of the wall from the second wall region 315. The flow separating structure 320 can vary in width.

In some embodiments, the flow separating structure 320 is significantly narrower than the adjacent second wall region 315. For example, a width of the second wall region 315 can be four to five times the width of a corresponding flow separating structure 320. In an embodiment of the invention, each of the plurality of flow separating structures can include a vertically extending member 322 a supporting member 321 coupling the vertically extending member 322 to the air impedance wall 310. The vertically extending member 322 can have a variety of shape configurations. For example, the vertically extending member 322 can include a vertically extending member of various shape configurations. In one example, the vertically extending member is a cylindrical rod. In other embodiments, the vertically extending member is a cuboid rod. The shapes of the vertically extending member mentioned above are only for example, and not to limit this disclosure.

The anti-acoustics streamline apparatus 300 is configured to disrupt the air flow 50 and minimize turbulence. Specifically, the air flow 50 emitted horizontally from the storage array module 200 is received and redirected through the plurality of openings 313A, 313B in the air impedance wall 310. In addition, the vertically extending member 322 coupled to the air impedance wall 310 provides enough drag resistance to disrupt the air flow 50 and push it upwards through the air plenum at the outlet side 60.

The anti-acoustics streamline apparatus 300 can be varied in size so that each flow separating structure 320 and corresponding air impedance wall 310 extends across a plurality of storage arrays. The use of the anti-acoustics streamline apparatus 300 reduces the amount of turbulence that would result if the air flow 50 was allowed to flow through the server device 10.

Figure 4:
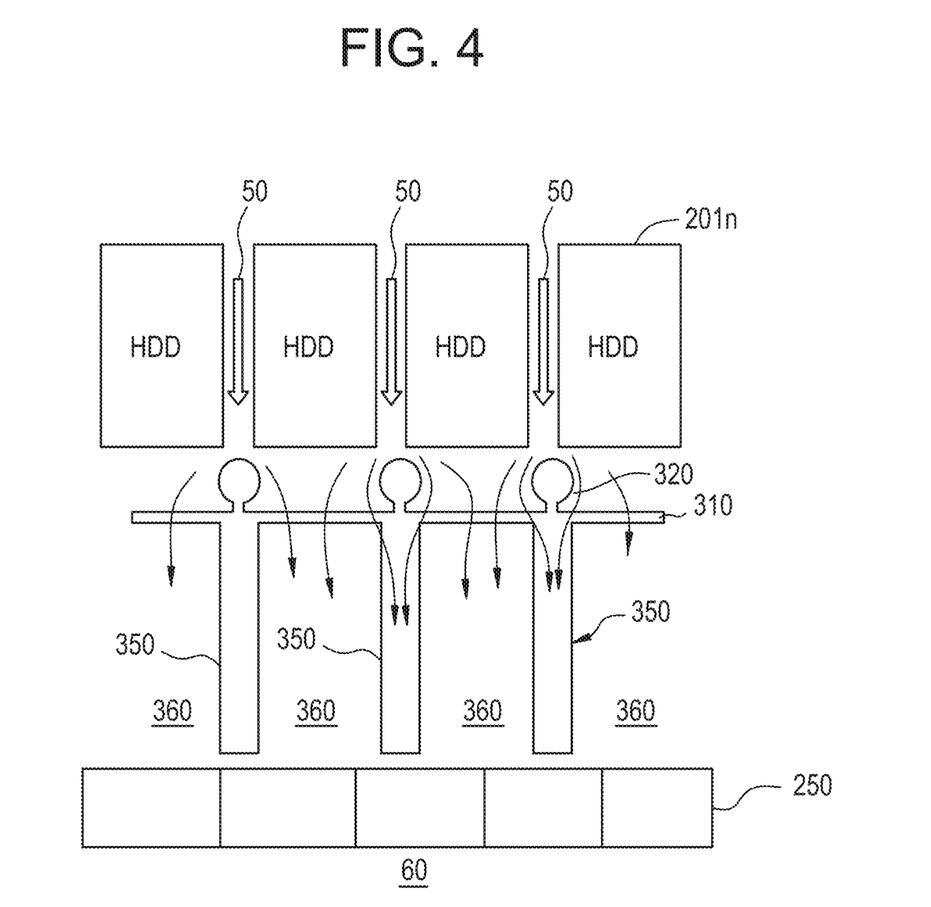
FIG. 4 shows the anti-acoustics streamline apparatus including a sound absorber disposed adjacent to the front face of the air impedance wall of the anti-acoustics streamline apparatus according to an embodiment.
Figure 5A:
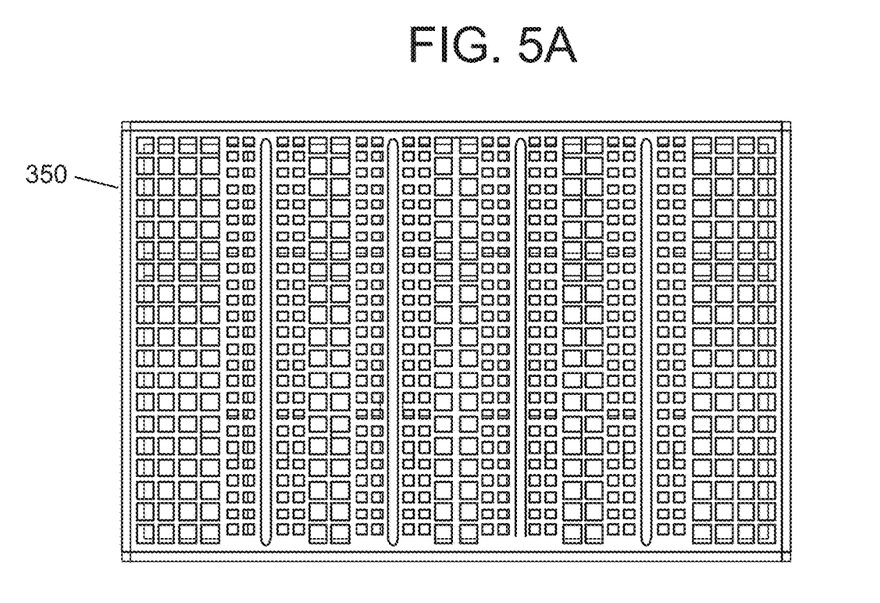
FIG. 5A-5B show the sound absorber of the anti-acoustics streamline apparatus according to an embodiment.
Figure 5B:
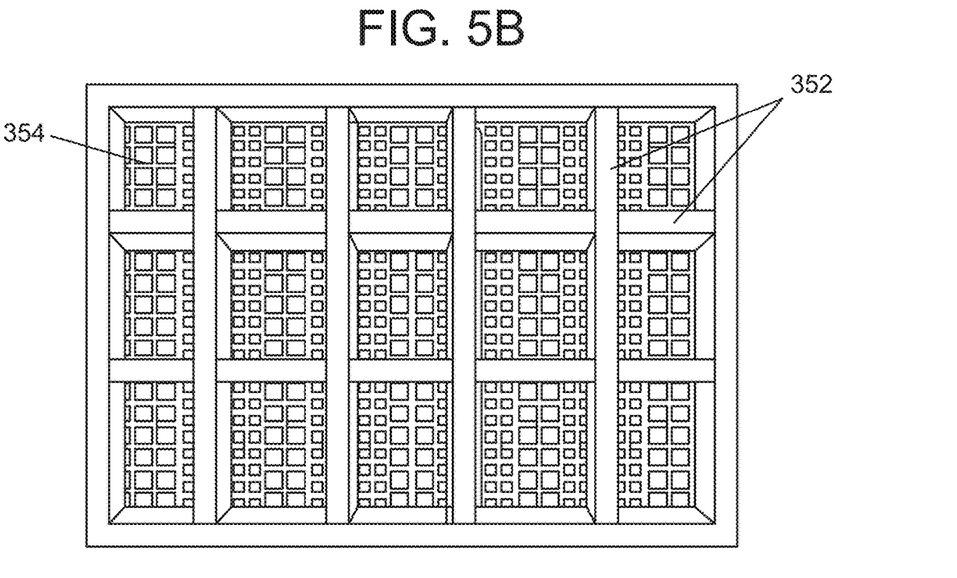
Figure 6A:
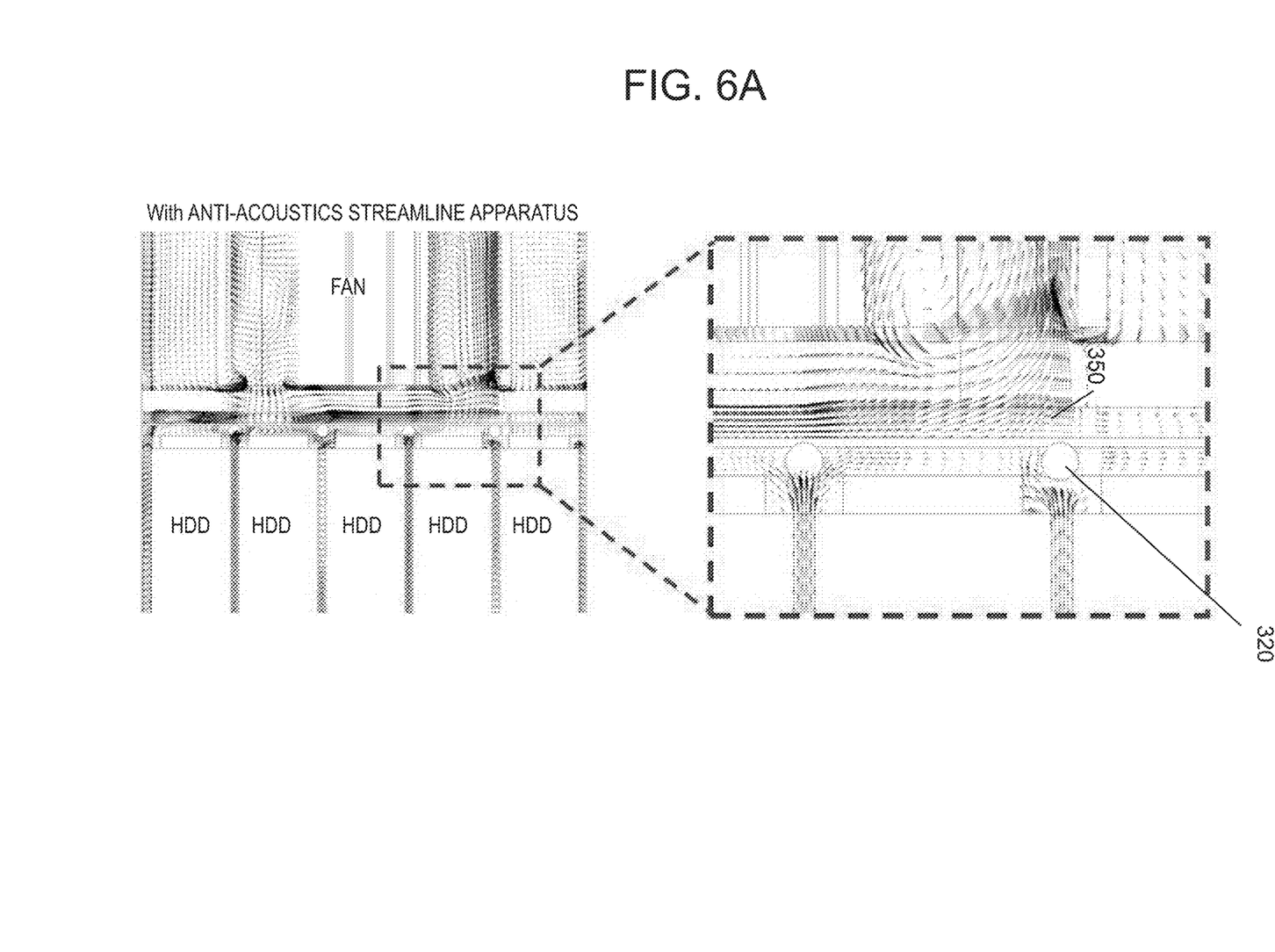
FIG. 6A-6B show pictographic displays of efficiency of the anti-acoustics streamline apparatus according to an embodiment.
Figure 6B:
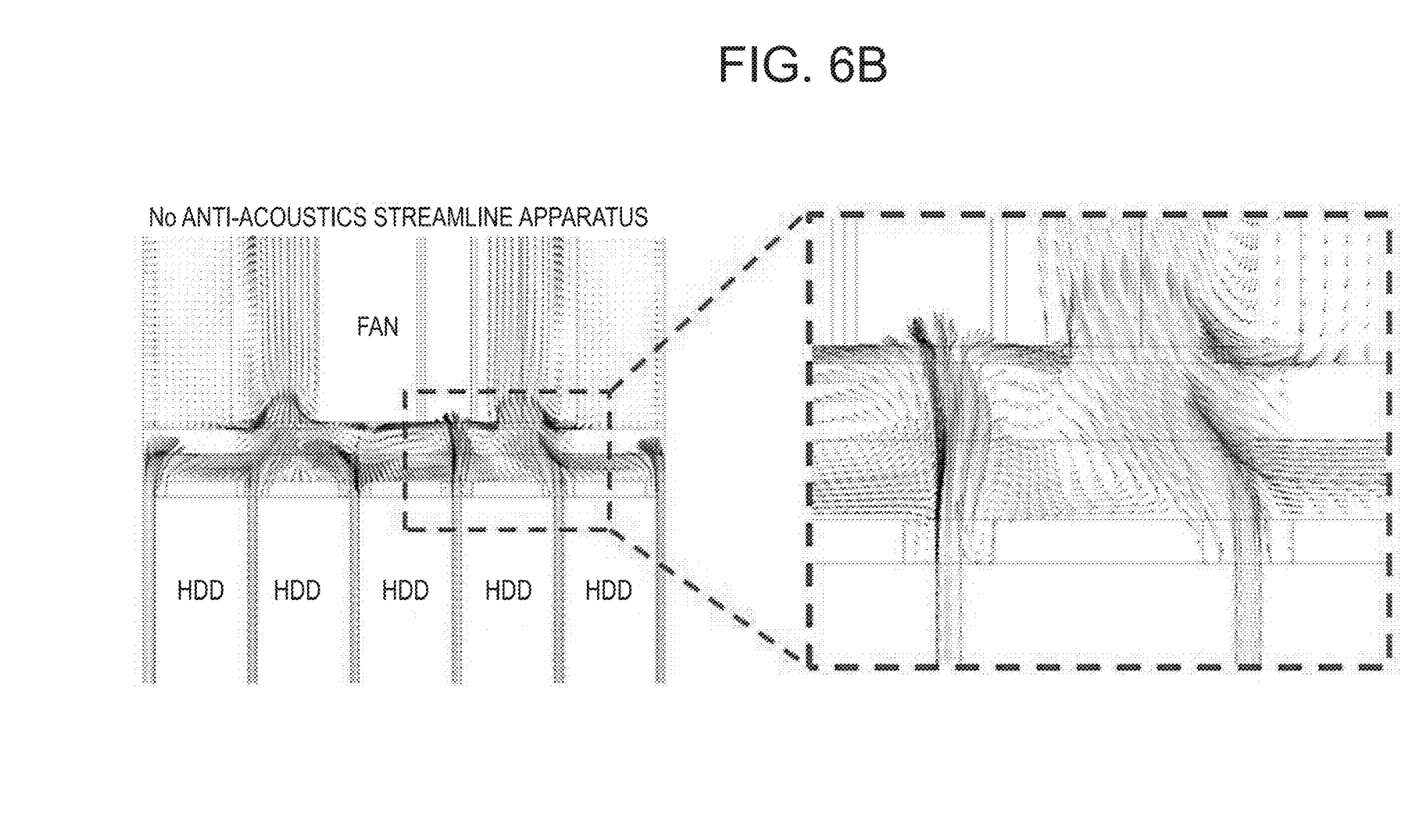

Referring now to FIG. 4, the anti-acoustics streamline apparatus 300 can also include a plurality of sound absorbers 350 disposed adjacent to the front face 311 of the air impedance wall 310. Each of the sound absorbers 350 is located in the middle of the air flow 50 path through which air passes. In an embodiment, the air flow 50 first passes through the space 202 between the plurality of storage arrays 201n. Then the air flow is disrupted by the flow separating structure 320 and passed through the plurality of openings 313A, 313B in the air impedance wall 310. At which point, the disrupted and separated air flow 50 is pushed to the plurality of sound absorbers 350. As illustrated in FIG. 4, the plurality of sound absorbers 350 is arranged between the plurality of fan modules 250 and the storage array module 200 such that each of the sound absorbers 350 faces one of the air outlet 60. As illustrated in FIG. 4, air flow 50 paths through which air is disrupted by the flow separating structure 320 and passed through the plurality of openings 313A, 313B in the air impedance wall 310 are located in the space defined by the sound absorbers 350. The sound absorbers 350 are arranged with a space 360 provided between them. The space 360 is formed by the frame of the sound absorbers being connected to the server device 10. In some embodiments, the space 360 can include a plurality of ducts 353 extending away from the rear face for discharging air flow. For example, in some embodiments, the plurality of sound absorbers 350 are between 5 to 6 mm from the storage array module 200.

Now referring to FIGS. 5A-5B and 6A-B. The sound absorbers 350 can include a main absorber 352, and an absorber 354. The main absorber 352 is installed behind the flow separating structure 320. The absorber 354 is placed horizontally. As indicated in FIG. 5, the main absorber 352 the absorber 354 are arranged to create an air duct array to enhance the sound absorption effect. Both main absorber & absorber can be used as same materials or different material which has different sound absorption coefficient. The main absorber 352 and the absorber 354 can be made from sound absorbing materials such as glass wool, urethane foam, and the like. Such materials are applicable as all or part of the materials of the sound absorbers 350, by selecting the best-suited sound absorbing materials. It should be realized that the sound absorbers 350 can be made of any material constructed to perform with high efficiency. The materials mentioned above are only for example, and not to limit this disclosure. The person having ordinary knowledge in the art may flexibly select any material in accordance with the disclosure.

The flow separating structure 320 is configured to secure the sound absorbers 350 to the server device 10. The flow separating structure 320 can be made of sheet metal using conventional metal fabrication techniques such as bending, forming, and stamping. Sounds resulting from the air flow 50 disrupted by the flow separating structure 320 and passed through the plurality of openings 313A, 313B in the air impedance wall 310 first collide with the sound absorbers 350, each of which faces the plurality of fan modules 250. The sound is then absorbed partially by the sound absorbers 350 via absorber 354 and main absorber 352. The radiated sounds that have not been absorbed then flow through the space 360 between the sound absorbers 350 and flow toward the plurality of ducts 353 formed by the sound absorbers 350. In other words, the sounds resulting from the air disruption at the flow separating structure 320 and the plurality of openings 313A, 313B in the air impedance wall 310 flow through the airflow paths by repeating collisions with the sound absorbers 350 and are eventually discharged from the server device through the ducts 353.

Every time a sound collides with the sound absorbers 350, the sound is absorbed and attenuated. This contributes to reduction in noise from the server device 10.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. An apparatus comprising:
an air impedance wall having a front face, a rear face, and a plurality of openings extending from the front face to the rear face defining open areas;
a plurality of flow separating structures disposed adjacent to the front face, each of the plurality of flow separating structure extending vertically along the front face of the wall,
wherein each of the plurality of flow separating structures is situated away from the air impedance wall,
wherein the plurality of openings are configured to define first wall regions in the air impedance wall adjacent to each of the plurality of flow separating structures and second wall regions between the first wall regions, and
wherein a first ratio of the open areas in the first wall regions to a total area in first wall regions is less than a second ratio of the open areas in the second wall regions to a total area in the second wall regions.

2. The apparatus of claim 1, wherein the each of the plurality of flow separating structures comprises at least one vertically extending member with a curved leading surface facing away from the front face and one or more supporting members coupling the at least one vertically extending member to the air impedance wall.

3. The apparatus of claim 2, wherein the at least one vertically extending member is a cylindrical rod.

4. The apparatus of claim 1, wherein the first ratio is uniform across the first wall regions, and wherein the second ratio is uniform across the second wall regions.

5. The apparatus of claim 1, wherein the second ratio is at least two time greater than the first ratio.

6. The apparatus of claim 1, wherein a width of each the first regions is 4× to 5× the width of a corresponding one of the plurality of flow separating structures.

7. The apparatus of claim 1, further comprising a sound absorber disposed adjacent to the rear face.

8. The apparatus of claim 7, wherein the sound absorber comprises a plurality of ducts extending away from the rear face.

9. The apparatus of claim 8, wherein the plurality of ducts are disposed in the sound absorber in regions between the plurality of flow separating structures.

10. A computing device comprising:
a housing having an inlet side, an outlet side, a first sidewall, and a second sidewall, the first sidewall and the second sidewall extending from the inlet side to the outlet side;
at least one row of drive bays extending at least partially from the first sidewall to the second sidewall, the at least one row drive bays configured to receive a plurality of hard disk drives and to provide a plurality of gaps between the plurality of hard disk drives; and
a streamlining device disposed between the at least one row of drive bays and the outlet side, the streamlining device comprising an air impedance wall having a front face, a rear face, and a plurality of openings extending from the front face to the rear face defining open areas, a plurality of flow separating structures disposed adjacent to the front face, each of the plurality of flow separating members extending vertically along the front face of the wall and facing one of the plurality of gaps,
wherein each of the plurality of flow separating members is situated away from the air impedance wall,
wherein the plurality of openings are configured to define first wall regions in the air impedance wall adjacent to each of the plurality of flow separating structures and second wall regions between the first wall regions, and
wherein a first ratio of the open areas in the first wall regions to a total area in first wall regions is less than a second ratio of the open areas in the second wall regions to a total area in the second wall regions.

11. The computing device of claim 10, wherein the each of the plurality of flow separating structures comprises at least one vertically extending member with a curved face facing away from the front face and one or more supporting members coupling the at least one vertically extending member to the air impedance wall.

12. The computing device of claim 11, wherein the at least one vertically extending member is a cylindrical rod.

13. The computing device of claim 10, wherein the first ratio is uniform across the first wall regions, and wherein the second ratio is uniform across the second wall regions.

14. The computing device of claim 10, wherein the second ratio is at least two time greater than the first ratio.

15. The computing device of claim 10, wherein a width of each the first regions is 8× to 10× the width of a corresponding one of the plurality of gaps.

16. The computing device of claim 10, further comprising a sound absorber disposed adjacent to the rear face and extending towards the outlet side.

17. The computing device of claim 16, wherein the sound absorber comprises a plurality of ducts extending away from the rear face and towards the outlet side.

18. The computing device of claim 17, wherein the plurality of ducts are disposed in the sound absorber in regions between the plurality of flow separating structures.

* * * * *